(12) United States Patent
Smith

(10) Patent No.: US 7,985,393 B2
(45) Date of Patent: Jul. 26, 2011

(54) PASTILLATION OF AMMONIUM SULFATE NITRATE

(75) Inventor: Michael R. Smith, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 126 days.

(21) Appl. No.: 12/415,312

(22) Filed: Mar. 31, 2009

(65) Prior Publication Data

US 2010/0242556 A1 Sep. 30, 2010

(51) Int. Cl.
*C01C 1/246* (2006.01)
*C05C 1/02* (2006.01)
*B29B 9/00* (2006.01)

(52) U.S. Cl. ............... 423/396; 71/59; 264/3.5; 264/13; 423/397

(58) Field of Classification Search .................. 423/395, 423/396, 397, 353; 425/6, 8; 264/3.5, 13
See application file for complete search history.

(56) References Cited

U.S. PATENT DOCUMENTS

| | | | | | |
|---|---|---|---|---|---|
| 4,623,307 | A | * | 11/1986 | Froeschke | 425/8 |
| 5,772,721 | A | * | 6/1998 | Kazemzadeh | 71/11 |
| 6,689,181 | B2 | * | 2/2004 | Highsmith et al. | 71/59 |
| 2004/0156935 | A1 | * | 8/2004 | Lumley et al. | 425/8 |

OTHER PUBLICATIONS

Sandvik "New Performance Standards in Premium Pastillation" Aug. 2007, pp. 1-16.*

* cited by examiner

*Primary Examiner* — Stuart Hendrickson
*Assistant Examiner* — Syed Iqbal

(57) ABSTRACT

A process is presented for the production of ammonium sulfate nitrate. The process provides for producing a highly uniform product and having a substantially uniform size. The process includes reacting ammonium sulfate and ammonium nitrate to form an FASN slurry melt. The slurry melt is continuously stirred and heated to keep the slurry melt under a shear thinned condition and at a uniform temperature until the slurry melt is extruded, cooled and solidified.

16 Claims, 2 Drawing Sheets

PASTILLATION OF AMMONIUM SULFATE NITRATE

FIELD OF THE INVENTION

This invention relates to a process for the production of uniform sized particles of fertilizer. More particularly it is directed to the production of a solid material used for fertilizer from a mixture of a solid and liquid.

BACKGROUND OF THE INVENTION

The production of mixed fertilizer products has been performed by mixing and/or reacting of the individual fertilizer components and forming the components/products into particles of the desired size range. The particles can comprise a range of sizes, representing a less-preferred product, and are screened, with off-size material separated and collected for reprocessing or to be sold as a less valuable product. Blended fertilizers are also common where the fertilizer components are mixed but not formed into particles containing all of the components, or nutrients. This leads to non-homogeneous particles with differing component content, in particular the amount of nitrogen can vary throughout the mixture. The nonuniformity leads to a nonuniformity in the spreading, time-release rates and effectiveness of the nutrients.

Fertilizers that have been formed into pellets or granules containing mixtures of the nutrients can also include trace compounds that are added for the enhancement of the fertilizer for a particular use. In addition, fertilizers that are formed into uniform particles can have more control over the release of nutrients into the soil over which the fertilizers are spread. The rates of release of the nutrients and the control of the composition can reduce the loss of the nutrients before plants have the ability to absorb them.

Prilling is one method of the production of small spherical pellets, wherein the melted material is passed through an apparatus called a prill head which generates streams of liquid droplets. The droplets have little or no volatile matter, and contain no solvents to be removed. The droplets are cooled with a continuous stream of cooling gas, typically air to solidify the droplets. Granulation is another method, whereby melted material is discharged through spray nozzles to create particles of the fertilizer that are mixed and agglomerated in a rotating drum.

However, both prilling and granulation methods have drawbacks. In granulation the particles produced lack uniformity (size and shape), and generally require reprocessing of a significant fraction of off-spec material, adding to expense through need for reprocessing equipment (screen, grinders, conveyors) and dust and sub-micrometer particulate capture equipment. In prilling, particles produced have better size and shape uniformity than with granulation but large quantities of air must be treated to capture sub-micrometer particulates before venting to the atmosphere.

BRIEF SUMMARY OF THE INVENTION

A process is presented for the production of ammonium sulfate nitrate. The process comprises forming a slurry melt by reacting ammonium nitrate and an excess of ammonium sulfate to form a slurry melt comprising ammonium sulfate nitrate. The slurry melt is continuously mixed to maintain it in a shear thinned state and to keep solids suspended in the slurry melt. The slurry melt is passed to a heated stator, where the slurry melt is continuously mixed as the slurry melt passes through the heated stator. A portion of the slurry melt is passed through a channel in the heated stator, and the slurry melt is extruded through a grid that moves over the channel. The slurry melt is extruded as droplets from the moving grid where the droplets drop to a cooled moving belt. The droplets for solid semi-ellipsoidal particles in the preferred 2 to 3 mm diameter range, and are collected from the moving belt.

Other objects, advantages and applications of the present invention will become apparent to those skilled in the art from the following detailed description and drawings.

DETAILED DESCRIPTION OF THE INVENTION

Figure 1:
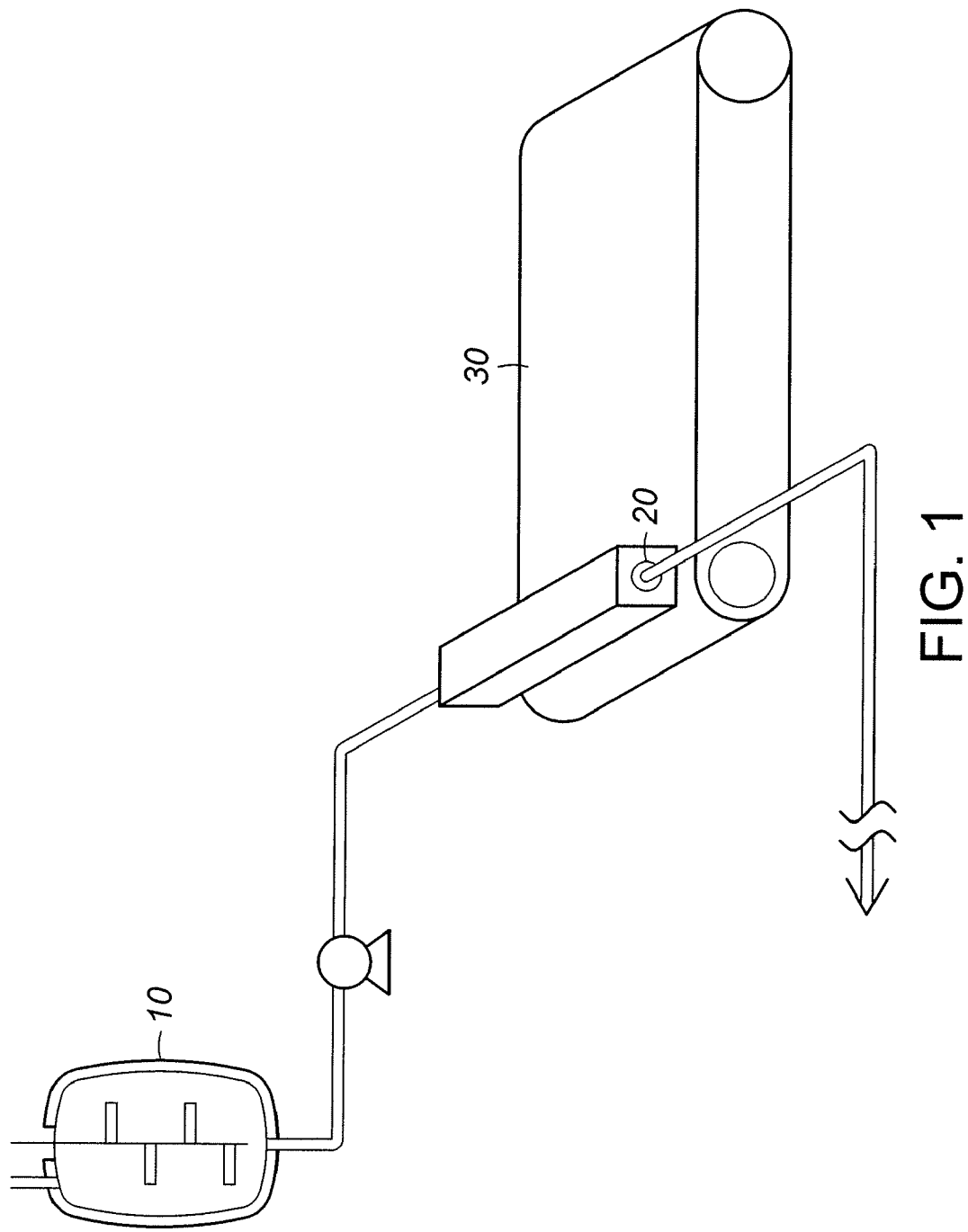
FIG. 1 is a diagram of the process.

Basic components for many fertilizers include a nitrogen source, and usually include a source of sulfur. Ammonium sulfate nitrate is common in the industry and generally refers to a mixture of double salts of ammonium sulfate with ammonium nitrate, and includes small amounts of the single salts. One ammonium sulfate nitrate product is a solid product known as fusion ammonium sulfate nitrate (FASN). FASN addresses many of the concerns of the fertilizer market for the production of solid particulate fertilizers such as ammonium nitrate, urea-ammonium nitrate, and calcium ammonium nitrate. One objective is the production of uniform size particles such that further processing, such as screening, grinding, remelting, fattening or further agglomeration is not needed. When referring to the particles as uniform, the particles have a generally uniform semi-ellipsoidal shape, with a flattened side, and a narrow size, or diameter, range of the particles.

Ammonium sulfate nitrate is a desirable fertilizer in that it has improved properties of stability and safety against detonation over other ammonium nitrate compounds. While ammonium sulfate nitrate (ASN) is a known compound, the process presented here is for the production of Honeywell's patented formulation, found in U.S. Pat. No. 6,689,181, and hereinafter, the use of ASN, or fusion ammonium sulfate nitrate (FASN) refers to this formulation. In addition, ammonium nitrate sulfate has superior resistance to moisture, to slow the delivery of the nutrients to plants and to limit the losses due to rain.

The present invention is to produce a substantially uniform sized particle for FASN, in the size range required by its users. FASN comprises a uniform mixture of ammonium sulfate nitrate (ASN) double salts and unreacted ammonium sulfate (AS) with a small amount of unreacted ammonium nitrate (AN). The desired product is one which is predominantly the double salt has a 2:1 ratio of ammonium nitrate to ammonium sulfate, or $(AN)_2AS$. A small amount of the 3:1 ratio double salt is formed, or $(AN)_3AS$. The process uses an excess of ammonium sulfate which favors the production of the 2:1 double salt over the 3:1 double salt. The desired ranges for the FASN composition, on a dry basis is shown in Table 1.

TABLE 1

|  | wt. % range |
| --- | --- |
| AS | 30-32 |
| $(AN)_2AS$ | 64-66 |
| $(AN)_3AS$ | 3-4 |

TABLE 1-continued

| | wt. % range |
|---|---|
| AN | 0-1 |
| FASN | 100 |

The formation of FASN using traditional methods involves considerable uncertainty with regards to equipment performance, suitability, on-stream performance, product quality, emissions, and capital and operating cost. The starting material for FASN is a molten slurry melt and has a shear-thinning property. The melt, which is formed in a reactor, comprises a molten ammonium sulfate nitrate in an amount between 60 and 70 wt. % and finely-ground, undissolved ammonium sulfate in an amount between 30 and 40 wt. %. The slurry melt must be kept moving, or under a shearing condition to prevent the viscosity from increasing and to prevent the separation of the solids. An increasing viscosity, or thickening of the melt, and/or a separation of the solids can lead to plugging of the lines and equipment. This can lead to non-uniformity in the size of the FASN particles.

One method of production of FASN is prilling, where the slurry melt must be elevated to, typically, between 150 to 250 feet above grade for the particles to be cooled and solidified sufficiently. Control over the size of the particles, including coalescence of several particles during cooling, and the production of sub-micrometer sized particles requires screening, recycling and remelting of a portion of the FASN.

Similarly with granulation of FASN, which is typically performed in a rotating drum device, there is a production of sub-micrometer sized particles, as well as a broader range of particles sizes. In revamps of an existing solid fertilizer production facility, both methods will require replacement of, or modification to, existing equipment, and will have a significant recycle of solids that do not meet specifications.

Figure 2:
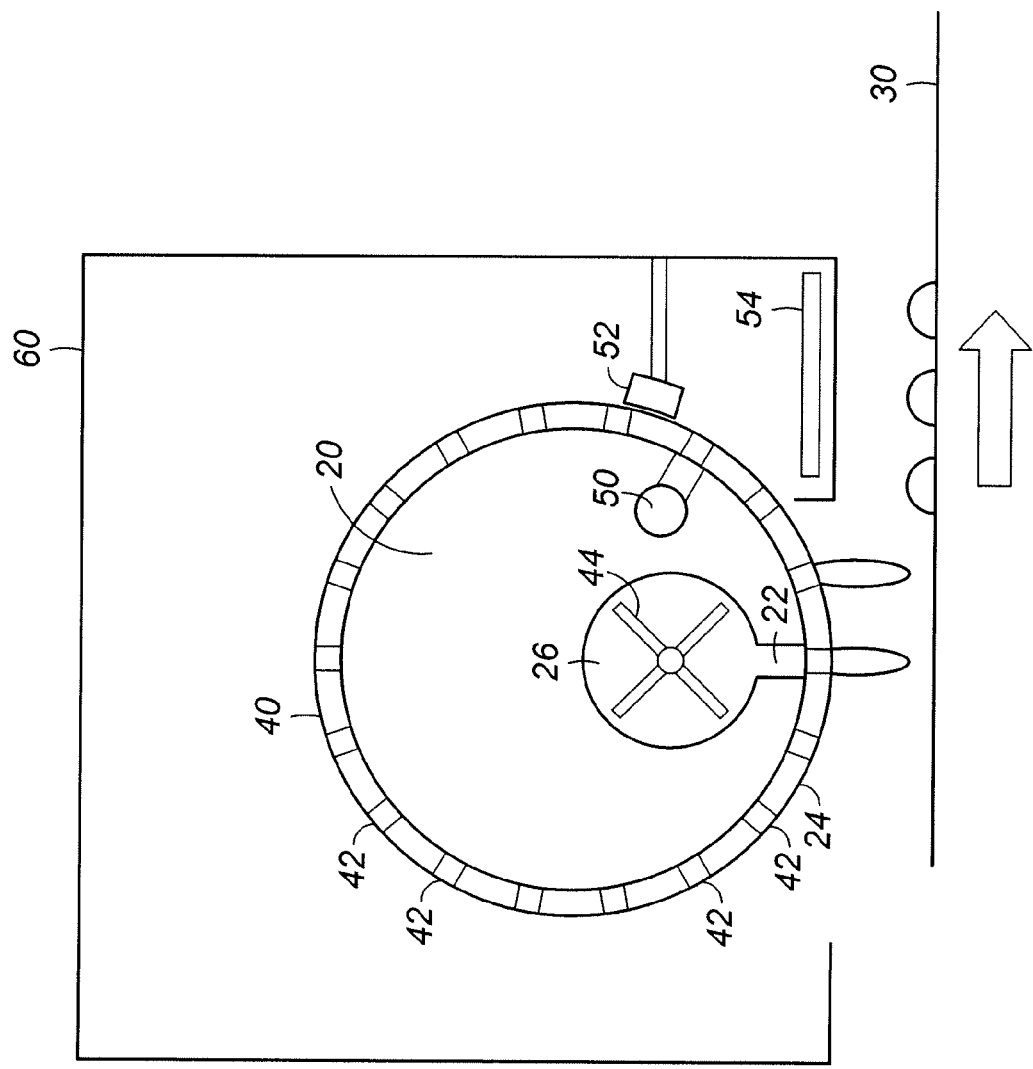
FIG. 2 is a diagram of a modified rotary forming pastillation device.

The present invention provides for the use of existing downstream assets, with few if any modifications, and provides for a low intensity, solid particle formation to produce a highly uniform size and shaped product. The process uses pastillation to form substantially uniform semi-ellipsoidal particles by solidification of a liquid melt on a cooling surface. There are several commercial manufacturers of pastillation equipment, however, the process needs to be modified to produce a uniform FASN product. The process, as shown in FIG. 1, comprises forming a slurry melt of ammonium sulfate nitrate and ammonium sulfate in a reactor 10. The slurry melt is passed to a heated stator 20, where the slurry melt is continuously agitated, and extruded as droplets onto a moving belt 30 that is cooled to form solid semi-ellipsoidal particles in the 1 to 3 mm range. Preferably, the droplets will form into particles in the 2 to 3 mm range, and more preferably to have a nominal diameter of 2.5 mm necessary to meet a size guide number (SGN) from 220 to 280. The preferred more narrow size range is highly uniform product. The slurry melt, as shown in FIG. 2, is passed through a channel 22 in the stator 20 and extruded through a moving grid 24 that slides over the channel 22. The channel 22 is part of a larger cylindrical passage 26 through which the slurry melt is transported. The slurry melt is continuously agitated to prevent an increase in the viscosity.

The heated stator 20 is comprised of a hollow, partially closed, cylindrical passage 26 within the heated stator 20, where the cylindrical passage 26 spans the length of the stator 20. The heating medium can be any suitable fluid, such as heated water, steam, heat transfer fluid or other compatible process fluid. The slurry melt enters under a small, less than 0.8 MPa, but controlled pressure that is sufficient to pass the slurry melt through the heated stator 20. The flow is kept to a level sufficient to maintain the suspension of solids and to keep the slurry melt free-moving. A portion of the slurry melt is passed out of the stator 20 and returned to the reactor 10. The slurry melt passes from the cylindrical passage 26 to a channel 22 located at the bottom of the stator 20. A perforated cylindrical drum 40 rotates around the heated stator 20. The holes 42 in the drum 40 pass across the bottom of the channel 22 where the slurry melt is extruded. The extruded slurry melt falls as drops onto a moving belt 30 that is cooled, and the cooled slurry melt solidifies to form the product particles, also known as pastilles of the desired diameter. The holes are sufficiently spaced to prevent neighboring drops from agglomerating with other drops on the cooling belt 30, and the holes 42 are sized sufficiently large to freely allow the passage of solid particles at or smaller than 300 micrometers in the maximum particle dimension.

The stator 20 and rotary drum 40 assembly will be horizontally oriented above and perpendicular to the direction of movement of the cooling belt 30, with the stator 20 and drum 40 spanning the width of the moving belt 30. The stator 20 and rotary drum 40 assembly is located at the inlet end of the cooled section of the belt 30 in a manner typical for such belt-coolers.

Inside the cylindrical passage 26 an agitation system is provided to continuously stir the slurry melt and to maintain the slurry melt in a uniformly consistent state along the passage 26. This agitation is to prevent the melt from thickening and to prevent any solids from settling as the melt flows along the passage 26 and out the channel 22. In one embodiment, the agitation system comprises an axially aligned, rotating, multi-bladed, wall-wiping paddle system 44. The paddle system 44 is rotated at a low speed of between approximately 200 rpm and 600 rpm, and preferably between 200 rpm and 400 rpm or at approximately 300 rpm.

The slurry melt comprises liquid ammonium sulfate nitrate in an amount between 60 and 80% by weight with a preferred amount between 60 and 70% by weight. The slurry melt also includes solid ammonium sulfate in an amount between 40 and 20% by weight with a preferred amount between 30 and 20% by weight. The solid ammonium sulfate is finely ground and it is preferred that when the slurry melt leaves the reactor 10, the solid particles are less than 300 micrometers in the maximum dimension. The solid particles partially react and partially dissolve in the slurry melt. The slurry melt is agitated in the reactor 10 to create and maintain the suspension of solids in the melt.

The process entails significant temperature control over the entire process, including the stirred reactor 10 and the heated stator 20, to maintain the slurry melt at a temperature between 180° C. and 200° C. Preferably, the process is controlled to heat the reactor 10 and the heated stator 20 to a temperature between 185° C. and 190° C. The process is controlled to prevent the temperature from falling below 178° C., where the slurry melt can begin to solidify, and to prevent the temperature from exceeding 210° C., where the ammonium nitrate begins to decompose.

The process is further controlled to maintain any pressures in the system below 1.14 MPa (150 psig), and preferably to maintain any pressures in the system below 0.8 MPa (100 psig). This includes operating the reactor at or near atmospheric pressure, and keeping the pressure in the piping and the heated stator at low operating pressures, typically less than 0.8 MPa, and preferably at pressures below 0.2 MPa. The maintenance of the slurry melt in a heated and stirred, or agitated, state to maintain a lower viscosity contributes to operating at lower pressures.

Although, in one embodiment, the agitation is provided by a multi-bladed wall wiping paddle system, the invention is intended to cover other agitation systems. One example is an auger type system that mixes and moves the slurry melt though the cylindrical passage 26 in the heated stator 20.

To maintain uniform droplets through the moving grid holes 42, it is preferred that the holes 42 in the moving drum 40 are kept free from buildup of solidified material or agglomerated solids. This includes the removal of residual slurry melt material that might adhere to the holes 42 or the drum 40 near the holes 42. In one embodiment, the process further comprises passing a hot fluid, such as hot water or steam through the moving grid holes 42 after the slurry melt has dropped from the moving drum 40 to the moving belt 30. The apparatus can include an additional channel 50 through the heated stator 20. The additional channel 50 extends a length at least as long as the span of the moving drum 40. In a practical consideration, the additional channel 50 extends the entire length of the stator 20.

A collection system surrounding the stator 20 and moving drum 40 can be included to recover any residual material blown out of the grid holes 42. The collection system can be incorporated into the surrounding heated shroud 60, and designed to prevent any residual material from falling to the moving belt 30. The system can include a scraper 52 for mechanically scraping of material around the edges of the holes 42. The spring-loaded scraper device 52 spans the entire length of the rotating drum 40. The positioning of the scraper 52 can be at different locations around the drum. One location is after blowing out residual material, and an alternate location is at a point just prior to the alignment of the drum's holes 42 with the channel 22 of the stator 20. It is preferred that the scraper 52 be made of a softer material than the drum to minimize wear on the rotating drum 40.

The system can also include a second moving belt system 54 for collecting and removing residual material from the environment inside the heated shroud 60. An alternate system can include a sloped and heated trough to collect the material as a liquid and channel the material to a heated sump for return to the reactor 10 for re-use.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A process for the production of ammonium sulfate nitrate, comprising:
   forming a slurry melt comprising ammonium sulfate nitrate and ammonium sulfate in a reactor having a temperature between 180° C. and 200° C.;
   passing the slurry melt to a heated stator having a temperature between 180° C. and 200° C. and a pressure of less than 0.8 MPa;
   continuously agitating the slurry melt in the heated stator to maintain the slurry melt under a shear-thinned condition;
   recycling a recycle portion of the slurry melt from the heated stator to the reactor;
   passing a portion of the slurry melt through a channel in the heated stator;
   extruding the portion of the slurry melt through a moving grid that slides over the channel, and wherein the moving grid comprises holes sized to form droplets; and
   cooling the droplets that spread to form uniform solid particles in the 1 to 3 mm diameter range.

2. The process of claim 1 wherein the droplets are formed into uniform solid particles in the 2 to 3 mm diameter range.

3. The process of claim 1, wherein the agitation in the heated stator is provided by a rotating multi-bladed paddle in the heated stator.

4. The process of claim 1 wherein the slurry melt comprises liquid ammonium sulfate nitrate between 60 and 80 wt. % and solid ammonium sulfate between 40 and 20 wt. %.

5. The process of claim 1 wherein the ammonium sulfate comprises solid particles of less than 300 micrometers in the maximum dimension.

6. The process of claim 1 wherein the formation of the slurry melt comprises:
   mixing ammonium sulfate and ammonium nitrate in the reactor to form a mixture; and
   agitating the mixture.

7. The process of claim 6 wherein the mixture is agitated in the reactor to maintain the liquid under a shear-thinned condition.

8. The process of claim 1 wherein the reactor is heated to a temperature between 185° C. and 190° C.

9. The process of claim 1 wherein the reactor is operated at a pressure under 1.14 MPa (150 psig).

10. The process of claim 9 wherein the reactor is operated at a pressure under 0.8 MPa (100 psig).

11. The process of claim 1 wherein the heated stator is heated to a temperature between 185° C. and 190° C.

12. The process of claim 1 further comprising passing a second heated fluid through the moving grid holes.

13. A process for the production of ammonium sulfate nitrate, comprising:
   mixing ammonium sulfate and ammonium nitrate in a reactor having a temperature between 180° C. and 200° C. to form a slurry melt that comprises liquid ammonium sulfate nitrate between 60 wt. % and 80 wt. % and solid ammonium sulfate between 20 wt. % and 40 wt. %.;
   agitating the slurry melt in the reactor;
   passing the slurry melt to a heated stator having a temperature between 180° C. and 200° C. and a pressure of less than 0.8 MPa;
   continuously agitating the slurry melt in the heated stator to maintain the slurry melt under a shear-thinned condition;
   recycling a recycle portion of the slurry melt from the heated stator to the reactor;
   passing a portion of the slurry melt through a channel in the heated stator;
   extruding the portion of the slurry melt through a moving grid that slides over the channel, and wherein the moving grid comprises holes sized to form droplets; and
   cooling the droplets that spread to form uniform solid particles in the 2 to 3 mm diameter range.

14. The process of claim 13 wherein the mixing of the slurry melt in the stator is performed by stirring the slurry with agitators.

15. The process of claim 13 further comprising passing a second heated fluid prough the moving grid holes.

16. The process of claim 13 wherein the recycle portion of the slurry melt is less than 50% of the slurry melt.

* * * * *